United States Patent
Suryanarayana et al.

(10) Patent No.: US 11,301,258 B2
(45) Date of Patent: Apr. 12, 2022

(54) SUPERVISED LEARNING BASED UEFI PRE-BOOT CONTROL

(71) Applicant: Dell Products L. P., Round Rock, TX (US)

(72) Inventors: Shekar Babu Suryanarayana, Karnataka (IN); Neeraj Kumar Pant, Karnataka (IN); Manikandan Radhakrishnan, Karnataka (IN)

(73) Assignee: Dell Products L.P., Round, TX (US)

( * ) Notice: Subject to any disclaimer, the term of this patent is extended or adjusted under 35 U.S.C. 154(b) by 294 days.

(21) Appl. No.: 16/580,092

(22) Filed: Sep. 24, 2019

(65) Prior Publication Data
US 2021/0089325 A1 Mar. 25, 2021

(51) Int. Cl.
*G06F 9/4401* (2018.01)
*G06N 20/00* (2019.01)

(52) U.S. Cl.
CPC ........... *G06F 9/4403* (2013.01); *G06N 20/00* (2019.01)

(58) Field of Classification Search
CPC ............................ G06F 9/4403; G06N 20/00
USPC ........................................................... 713/2
See application file for complete search history.

(56) References Cited

U.S. PATENT DOCUMENTS

| | | | | | |
|---|---|---|---|---|---|
| 5,964,873 | A * | 10/1999 | Choi | ......................... | G06F 8/65 713/2 |
| 6,018,806 | A * | 1/2000 | Cortopassi | ................ | G06F 8/65 714/6.31 |
| 6,282,642 | B1 * | 8/2001 | Cromer | .................. | G06F 9/4416 713/1 |
| 6,356,965 | B1 * | 3/2002 | Broyles | ................. | G06F 9/4408 709/220 |
| 6,438,688 | B1 * | 8/2002 | Nunn | ........................ | G06F 8/65 709/220 |
| 6,671,802 | B1 * | 12/2003 | Ott | ....................... | G06F 9/44505 713/100 |
| 6,725,318 | B1 * | 4/2004 | Sherman | ............... | G06F 3/0202 710/2 |
| 8,082,439 | B2 | 12/2011 | Desselle et al. | | |
| 8,601,175 | B1 * | 12/2013 | Todd | ....................... | G06F 16/25 710/19 |
| 8,856,789 | B2 | 10/2014 | Torrey | | |
| 9,043,638 | B1 * | 5/2015 | Su | .......................... | G06F 11/006 714/6.1 |
| 9,317,398 | B1 * | 4/2016 | Masse | ....................... | G06F 8/20 |
| 2002/0032758 | A1 * | 3/2002 | Yen | ..................... | G06F 9/44521 709/220 |

(Continued)

*Primary Examiner* — Paul R. Myers
(74) *Attorney, Agent, or Firm* — Larson Newman, LLP

(57) ABSTRACT

In some examples, a computing device may initiate a chat session with a software agent on a server. During the chat session, the software agent may ask questions and receive answers in response. The server may process logs sent from the computing device and a transcript of the chat session to identify tokens. A supervised learning model on the server may select a script based on the tokens and send the script to the computing device. The computing device may store the script in non-volatile memory and boot into a setup state of a basic input output system (BIOS) of the computing device. The BIOS may retrieve the script, convert BIOS procedure calls in the script into an action tree, and execute the actions in the action tree, causing a virtual mouse and/or virtual keyboard to provide input to the BIOS to modify the BIOS to address an issue.

18 Claims, 8 Drawing Sheets

(56) References Cited

U.S. PATENT DOCUMENTS

| | | | |
|---|---|---|---|
| 2003/0163765 A1* | 8/2003 | Eckardt | G06F 11/2284 714/36 |
| 2003/0196079 A1* | 10/2003 | Tyner | G06F 9/4401 713/1 |
| 2009/0094603 A1* | 4/2009 | Hiltgen | G06F 9/45558 718/1 |
| 2012/0054214 A1* | 3/2012 | Yamagishi | H04N 21/2668 707/758 |
| 2012/0272095 A1* | 10/2012 | Liu | G06F 11/1417 714/6.1 |
| 2012/0297178 A1* | 11/2012 | Peng | G06F 11/2289 713/2 |
| 2015/0277895 A1* | 10/2015 | Samuel | G06F 9/44505 713/1 |
| 2015/0370576 A1* | 12/2015 | Wynn | G06F 11/3024 713/2 |
| 2016/0048436 A1* | 2/2016 | Yamazaki | G06F 11/2289 713/2 |
| 2017/0168903 A1* | 6/2017 | Dornemann | G06F 11/2097 |
| 2017/0228228 A1* | 8/2017 | Lin | G06F 8/61 |
| 2017/0293451 A1* | 10/2017 | Pan | G06F 9/50 |
| 2018/0293187 A1* | 10/2018 | Radhakrishnan | G06F 9/4401 |
| 2018/0322013 A1* | 11/2018 | Yang | G06F 9/4403 |
| 2019/0020540 A1* | 1/2019 | Yen | H04L 67/34 |
| 2019/0079776 A1* | 3/2019 | Okayasu | G06F 9/4411 |
| 2019/0102695 A1* | 4/2019 | Biswas | G06F 13/102 |
| 2019/0121981 A1* | 4/2019 | Fu | H04L 9/321 |
| 2020/0334043 A1* | 10/2020 | Zlotnick | G06F 9/45558 |
| 2021/0026737 A1* | 1/2021 | McAdams | G06F 11/1417 |

* cited by examiner

SUPERVISED LEARNING BASED UEFI PRE-BOOT CONTROL

BACKGROUND OF THE INVENTION

Field of the Invention

This invention relates generally to configuring a basic input output system (BIOS), such as Unified Extensible Firmware Interface (UEFI), and more particularly to enabling a remote software agent ("chat bot") to automatically configure the BIOS, e.g., to resolve an issue (e.g., including enabling or disabling one or more features).

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, troubleshooting a BIOS-related issue is a manual process. For example, a user may call a technical support specialist (e.g., a human being) who provides suggestions on modifying the BIOS settings. The support specialist is unable to view what the user is doing to modify the BIOS settings. Nor is the support specialist able to see the computer's behavior after the modifications are made. Instead, the user describes over the phone to the support specialist what the user is doing and how the computer is behaving. Such a process is time consuming and frustrating for the both the user and the support specialist.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may initiate a chat session with a software agent on a server. During the chat session, the software agent may ask questions and receive answers in response. The server may process logs sent from the computing device and a transcript of the chat session to identify tokens. A supervised learning model on the server may select a script based on the tokens and send the script to the computing device. The computing device may store the script in non-volatile memory and boot into a setup state of a basic input output system (BIOS) of the computing device. The BIOS may retrieve the script, convert BIOS procedure calls in the script into an action tree, and execute the actions in the action tree, causing a virtual mouse and/or virtual keyboard to provide input to the BIOS to modify the BIOS to address an issue.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
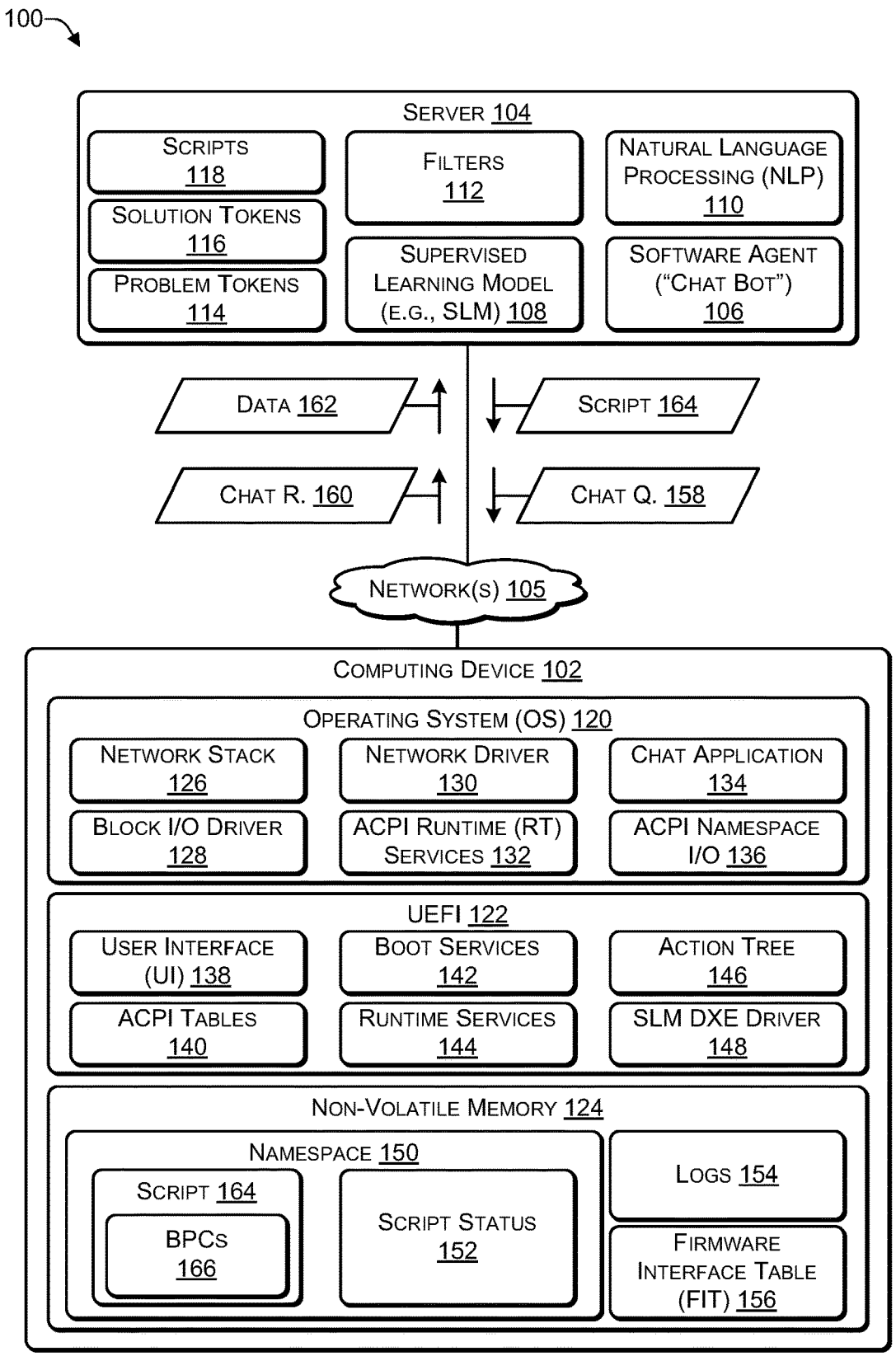
FIG. 1 is a block diagram of a system that includes a computing device to execute a script to modify a basic input output system (BIOS), according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a software agent (also referred to as a chat bot) to receive information about an issue associated with a computing device, use machine learning to parse the information, select or create a script (based on the parsed information) from multiple scripts, and execute the script to modify the BIOS. For example, the script may include BIOS procedure calls (BPCs) or other instructions that are capable of modifying the BIOS to create a modified BIOS. The modified BIOS may address the issue associated with the computing device.

The advantages of using a software agent include reducing support costs (e.g., by using software rather than humans) and the ability to provide support around the clock (e.g., 24 hours a day, 7 days a week). When a user has an issue with a computing device, the user may use a chat application to connect to a software agent being executed on a server. The software agent may chat (e.g., exchange messages) with the user by asking questions regarding the issue, the behavior of the computing device, and the like. The information (e.g., chat data) provided by the user responding to the questions from the software agent may be received by the server. In addition, the chat application may retrieve and send diagnostic error messages, system log messages, configuration information, and the like to the server. After receiving the data, the server may filter the data (e.g., to remove stop words, such as, for example, "the", "a", "an", "in" and the like). The server may perform natural language processing to break the information into multiple problem-related tokens. Based on the problem-related tokens, a machine learning module executing on the server may select or create a script to modify the BIOS. For example, the script may include BPCs or other instructions capable of modifying the BIOS. The software agent may send the script to the computing device and install the script in a location in non-volatile memory of the computing device that is accessible to the BIOS. The software agent may cause the computing device to perform a re-boot into the BIOS (e.g., the re-boot causes the computing device to enter into BIOS setup). The BIOS may be configured to determine if a script is available at a particular location (e.g., in non-volatile memory). In this example, the BIOS may determine that a script is available at the particular location in the non-volatile memory (e.g., where the software agent stored the script). After determining that the script is available in the particular location, the BIOS may execute the script, causing the commands in the script (e.g., BPCs) to make modifications to the BIOS to create a modified BIOS. The modified BIOS may address the issue that the user had provided information regarding. In some cases, the script may cause the computing device to re-boot into the operating system while, in other cases, the computing device, after executing the script, may boot into the operating system.

In some cases, the computing device may use Advanced Configuration and Power Interface (ACPI) runtime (RT) services to analyze the information received from the computing device. The ACPI RT services may use a driver execution environment (DXE) to interact with the computing device because in DXE, chipset-related drivers (including network communications and network protocol drivers) are loaded. For example, the computing device may go through multiple phases, include SEC (security), PEI (pre-EFI platform initialization), DXE (driver execution environment), BDS (boot device select), TSL (transient system load), RT (runtime), and AL (afterlife).

As a first example, a computing device may include one or more processors and one or more non-transitory computer-readable storage media to store instructions executable by the one or more processors to perform various operations. For example, the operations may include sending data associated with an issue of the computing device to a server. The data may include a chat transcript comprising questions sent by a software agent executing on the server and answers corresponding to the questions. The data may include one or more logs stored on the computing device, such as, for example, a system log, an error log, or a diagnostic log. The operations may include receiving a script from the server and storing the script in a namespace of a non-volatile memory of the computing device. The script may include one or more BIOS procedure calls. The operations may include rebooting the computing device into a setup state of a basic input output system (BIOS) of the computing device. The operations may include executing the script to modify the BIOS to create a modified BIOS. For example, the operations may include determining that the script includes one or more BIOS procedure calls, creating an action tree based on the one or more BIOS procedure calls, and executing each action in the action tree using at least one of a virtual mouse or a virtual keyboard to modify the BIOS. The modified BIOS may address the issue of the computing device. The operations may include storing, in a namespace of the non-volatile memory, a status indicating that the script was either successfully executed or unsuccessful. The operations may include rebooting the computing device to boot into an operating system.

As a second example, a server may include one or more processors and one or more non-transitory computer-readable storage media to store instructions that are executable by the one or more processors to perform various operations. For example, the operations may include receiving, by a software agent executing on the server, a request from a chat application executing on a computing device to initiate a chat session. The software agent may send one or more questions, via the chat session, requesting information about an issue associated with the computing device. The software agent may receive, from the computing device via the chat session, one or more responses corresponding to the one or more questions. The operations may include instructing the computing device to retrieve one or more logs stored on the computing device. The operations may include receiving one or more logs stored on the computing device. The operations may include processing (i) the logs and (ii) a transcript of the chat session to create a plurality of problem tokens. For example, the logs and the transcript may be filtered to remove stop words to create a filtered chat session and natural language processing may be performed on the filtered chat session to identify the plurality of problem tokens. The operations may include selecting, based on the plurality of problem tokens, a script to address the issue associated with the computing device. For example, a supervised learning model may be used to select the script based on the plurality of problem tokens. The operations may include sending the script to the computing device. The operations may include instructing the computing device to store the script in a namespace in a non-volatile memory. The operations may include instructing the computing device to reboot into a setup state of a basic input output system (BIOS) of the computing device. The script may include one or more BIOS procedure calls. Instructing the computing device to reboot into a setup state of a basic input output system (BIOS) of the computing device may cause the computing device to retrieve the script from the nonvolatile memory and execute the script to modify the BIOS to address the issue associated with the computing device. For example, executing the script may include constructing an action tree based on the one or more BIOS procedure calls. Each action in the action tree may cause the BIOS to receive input (in the setup state) from a virtual mouse, a virtual keyboard, or both to modify the BIOS.

FIG. 1 is a block diagram of a system 100 that includes a computing device to execute a script to modify a basic input output system (BIOS), according to some embodiments. In the system 100, a computing device 102 may be connected to a server 104 via at least one network 105.

The server 104 may include multiple servers associated with a manufacturer of computing devices. For example, the server 104 may be used by the manufacturer to provide technical support to customers who have a purchased a computing device, such as the representative computing device 102. The server 104 may host various software components and data, such as, for example, a representative software agent ("chat bot") 106, a supervised machine learning model (SLM) 108, natural language processing (NLP) 110, one or more language filters 112, one or more problem tokens 114, one or more solution tokens 116, and one or more scripts 118. The server 104 may host multiple software agents, such as the software agent 106, to provide automated technical support to multiple customers substantially simultaneously.

The SLM 108 may be trained to perform an analysis of data, including system logs, and data in a chat between a customer (e.g., associated with the computing device 102) and the software agent 106. The chat data may include information about error messages that the computing device 102 has displayed. Based on the analysis, the machine learning model 108 may identify a script from the scripts 118 to resolve the customer's issue. The SLM 108 may use a particular type of learning algorithm. Supervised learning is the machine learning task of learning a function that maps an input to an output based on input-output pairs. The SLM 108 is trained using labeled data to enable the SLM 108 to predict (e.g., identify) solutions to computing-related issues. In supervised learning, each example is a pair consisting of an input object (typically a vector) and a desired output value (the supervisory signal). A supervised learning algorithm analyzes the training data and produces an inferred function, which can be used for mapping new examples. The SLM 108 may be implemented using an algorithm, such as, for example, Support Vector Machines, linear regression, logistic regression, naive Bayes, linear discriminant analysis, decision trees, k-nearest neighbor algorithm, Neural Networks (Multilayer perceptron) or the like.

The NLP 110 is a computer program to analyze natural language data, such as system logs and data from a chat between the software agent 106 and a user associated with the computing device 102. The NLP 110 may use a machine learning model to identify words and phrases associated with the problem. The filters 112 may include filters to remove stop words before the NLP 110 is used to process the resulting data. Stop words are common words in a language, such as, for example, a, able, about, across, after, all, almost, also, am, among, an, and, any, are, as, at, be, because, been, but, by, can, cannot, could, dear, did, do, does, either, else, ever, every, for, from, get, got, had, has, have, he, her, hers, him, his, how, however, i, if, in, into, is, it, its, just, least, let, like, likely, may, me, might, most, must, my, neither, no, nor, not, of, off, often, on, only, or, other, our, own, rather, said, say, says, she, should, since, so, some, than, that, the, their, them, then, there, these, they, this, tis, to, too, was, us, wants, was, we, were, what, when, where, which, while, who, whom, why, will, with, would, yet, you, and your. After the filters 112 remove the stop words, the NLP 110 may analyze the filtered data to identify problem-related tokens, e.g., key words or phrases in the data that identify the issue that the user is describing and the system logs are identifying. The server 104 may match the problem-related tokens with the problem tokens 114 and identify solution tokens 116 corresponding to the problem tokens 114. Based on the solution tokens 116 corresponding to the problem tokens 114, the server 104 may select a particular one of the scripts 118.

The problem tokens 114 and the solution tokens 116 are words or phrases that are each related to a particular issue (or set of issues) that have been placed in a standardized format to enable matching the problem tokens 114 to the solution tokens 116. For example, when a user is trying to enable or disable a secure boot feature of the computing device 102, the problem tokens derived from the chat transcript and/or system logs may include words or phrases such as, for example, security, BIOS, secure boot, enable, disable, and the like. The problem tokens may be used to identify similar (or the same) solutions tokens. Based on the similar solution tokens, the server 104 may select a particular script of the scripts 118 to address the issue.

The computing device 102 may include an operating system 120, a type of basic input output system (BIOS) such as a Unified Extensible Firmware Interface (UEFI) 122, and non-volatile memory 124 (e.g., a storage device that has non-volatile memory). Non-volatile memory 124 is a type of storage where the contents survive a reboot. For example, if data is stored in a particular location in the non-volatile memory 124 prior to a reboot, then after the reboot, the data is available (e.g., for retrieval) in the particular location of the non-volatile memory 124. For example, the non-volatile memory 124 may be a hard drive, a solid state drive (SSD), non-volatile memory express (NVMe) memory, or another type of memory device or storage device that retains the contents of the device during a reboot.

The operating system 120 may include a network stack 126, a block input/output (I/O) driver 128, a network driver 130, Advanced Configuration and Power Interface (ACPI) runtime (RT) services 132, and ACPI namespace I/O 136. The network stack 126 (also called a protocol stack) is an implementation of a computer networking protocol (e.g., Ethernet, Wi-Fi, or the like). The lowest protocol in the network stack 126 may deal with low-level interaction with the communications hardware, with each higher layer adding additional capabilities. The network stack 126 may have three major sections: media, transport, and applications. The media-to-transport interface defines how transport protocol software makes use of particular media and hardware types and is associated with a device driver. For example, this interface level may define how Transmission Control Protocol (TCP) and Internet Protocol (IP) transport software talk to a network interface controller (NIC) of the computing device 102. The application-to-transport interface defines how application programs make use of the transport layers. For example, this interface level defines how a web browser communicates with TCP/IP transport software. The block I/O driver 128 provides access to devices (e.g., disk drives or other non-volatile storage devices) that transfer randomly accessible data in fixed-size blocks. The network driver 130 enables the computing device 102 to communicate with other devices (e.g., the server 104) via the network 105. For example, the network driver 130 may use Ethernet, Wi-Fi, and/or another communications protocol that is compatible with the network 105. The ACPI RT services 132 provide various runtime services. The chat application 134 may enable a user to initiate and engage in a chat with technical support, including interacting with the software agent 106 and interacting with human agents. The ACPI runtime (RT) services 144 may interact with the SLM DXE driver 148 to enable the SLM 108 to interact with the computing device 102. The SLM DXE driver 148 can interact with the block i/o driver 128 and with the non-volatile memory 124. The chat transcript, logs 154 and other data may be saved in the namespace 150.

ACPI namespace is a hierarchy of objects identified by names and paths that describes objects that the operating system 120 may use. For example, there is no standard hardware mechanism for enumerating Peripheral Component Interconnect (PCI) host bridges, so the ACPI namespace may describe each host bridge. The ACPI namespace may use a hierarchical representation to enumerate the ACPI devices. A system bus may be the root of enumeration for the ACPI devices. Enumerable buses such as PCI and universal serial bus (USB) may use an encoding technique to enable ACPI to encode bus specific addresses of the devices to enable each device to be found in ACPI, even in cases where ACPI may not load drivers for these devices. The ACPI namespace I/O 136 may enable modules in the operating system 120 and the UEFI 122 to perform I/O operations to the ACPI namespace.

The UEFI 122 is used as an example of a BIOS used by the computing device 102. Of course, the computing device 102 may use another type of BIOS (e.g., Coreboot) instead of the UEFI 122. The UEFI 122 may include a user interface (UI) 138, an ACPI tables 140, boot services 142, runtime services 144, an action tree 146, and a supervised learning model (SLM) driver execution environment (DXE) driver 148. The UI 138 may enable a user to navigate the UEFI 122 to set various parameters, including enabling or disabling various features. The UEFI 122 may use information obtained during initialization to update one or more of the ACPI tables 140 with various platform configurations and power interface data, before passing control to a bootstrap loader to load the operating system 120. The ACPI tables 140 may include an extended root system description table (XSDT), which is the first table used by the ACPI subsystem because it contains the addresses of other ACPI tables. The XSDT may point to the fixed ACPI description table (FADT) as well as other tables that the OS 120 uses during initialization. After the OS 120 initializes, the FADT may direct the ACPI subsystem to the differentiated system description table (DSDT), located at the beginning of the namespace because it is the first table that contains a definition block. The ACPI subsystem may process the DSDT and building the namespace from the ACPI definition blocks. The XSDT ma points to secondary system description tables (SSDTs) and may add them to the namespace. The ACPI data tables may provide the OS 120 with data about the system hardware. After the OS 120 has built the namespace from the ACPI tables 140, the OS 120 may begin traversing the namespace and loading device drivers for devices encountered in the namespace.

The UEFI 122 may provide the boot services 142 and the runtime services 144. The boot services 142 may include services provided when the UEFI 122 is executing (e.g., before the OS 120 is executing and before an ExitBootServices call). The runtime services 144 may include services that are accessible when the OS 120 is executing. The action tree 146 may enable BPCs or other calls to be translated into mouse and keyboard actions performed by a virtual keyboard and a virtual mouse to modify the UEFI.

The non-volatile memory 124 may be used to store a namespace 150, a script 164, a script execution status 152 (e.g., results indicating whether or not the script 164 was successfully executed), one or more logs 154 (e.g., system logs, device logs, error messages, and the like), and a firmware interface table (FIT) 156.

When a user has an issue with the computing device 102, the user may use the chat application 134 to initiate a chat with the software agent 106. For example, the user may have an issue regarding enabling or disabling a feature (e.g., Wi-Fi, secure boot, hyper-threading, or the like) or the user may have problems with a particular feature, e.g., the particular feature is enabled but not all of the functionality is available. The software agent 106 may initiate the assistance by attempting to understand the issue or problem. For example, the software agent 106 may send a series of chat questions, such as a representative chat question 158, and receive in response, a series of chat responses from the user, such as a representative chat response 160. In some cases, the software agent 106 may use the chat application 134 to retrieve one or more of the logs 154 (e.g., system logs, error logs, and the like).

The software agent 106 may thus receive data 162 from the computing device 102 that includes a transcript of the chat session (e.g., including the chat questions 158 and/or the chat responses 160) and at least a portion of the logs 154. The data 162 may be filtered using the filters 112 (e.g., to remove stop words) and analyzed using the NLP 110 to identify one or more problem tokens 114. The SLM 108 may analyze the problem tokens 114 to identify corresponding solution tokens 116. If a particular script in the scripts 118 is associated with the corresponding solution tokens 116, then the server 104 may select a script 164 from the scripts 118 and send the script 164 (e.g., via the chat application 134) to the computing device 102. If a particular script in the scripts 118 is not associated with the corresponding solution tokens 116, then the server 104 may create the script 164 to address the issue and send the script 164 (e.g., via the chat application 134) to the computing device 102. For example, the chat responses 160 may be used to create the script 164 that includes appropriate BIOS procedure calls (BPCs 166) to address the issues.

The chat application 134 may receive the script 164 and use the ACPI RT services 142 to store the script 164 in the namespace 150 in the non-volatile memory 124. After the script 164 has been stored in the namespace 150, the chat application 134 (e.g., based on an instruction from the software agent 106) may trigger a reboot of the computing device 102 into BIOS setup, e.g., a state in which the UEFI 122 can be setup. The boot services 142 may, in response to determining that a reboot into a setup of the UEFI 122 occurred, retrieve the script 164 from the namespace 150 and execute the script 164 (e.g., execute the BIOS procedure calls 166 in the script 164). Executing the script 164 may cause one or more modifications to be performed to the UEFI 122 to create a modified UEFI 122. The modified UEFI 122 may be modified to address the issue(s) identified based on the data 162. After the BPCs in the script 164 have been executed, the UEFI 122 may perform a reboot. In some cases, a last command in the script 164 may instruct the computing device 102 to perform a reboot. Thus, the UEFI 122 (e.g., BIOS) may be modified automatically and unattended by executing the script 164 to perform a pre-boot (e.g., before the OS 120 is booted) reconfiguration of the UEFI 122.

The chat application 134 in the OS 120 enables a user to communicate with the server 104 (e.g., associated with a manufacturer of the computing device 102) and to provide the data 162 (e.g., including response to queries sent by the software agent 106) to the server 104. After filtering the data 162, using the NLP 110, and using the SLM 108, the data 162 may be reduced to one or more problem tokens 114. The server 104 may determine if solution tokens 116 corresponding to the problem tokens 114 exist. If there are corresponding solution tokens 116, then the server 104 may select the script 164 from the scripts 118 and send the script 164 to the computing device 102. If the server 104 is unable to identify solution tokens 116 corresponding to the problem tokens 114, then the server 104 may create the script 164 to address the issue, store the script in the scripts 118, and send the script 164 to the computing device 102. For example, a manufacturer of the computing device 102 may release a new version of the BIOS that changes some of the configuration parameters. The user may be confused with the new BIOS layout and contact support and begin chatting with the software agent 106. In this case, because the BIOS is a new version, the scripts 118 may not address the issue that the user is encountering. The server 104 may determine that the problem tokens 114 derived from the chat responses 160 and/or the logs 154 do not have corresponding solution tokens 116 and create a new script (e.g., the script 164) to address the issue.

The script 164 may include a sequence of actions to be performed on the UEFI (BIOS) 122 to update the BIOS settings. After the chat application 134 receives the script 164, the script 164 may be saved to the namespace 150 in the non-volatile memory 124. After saving the script 164, the chat application 134 may cause the computing device 102 to reboot to a setup state of the UEFI 122. After the reboot, the UEFI 122 checks the namespace 150 to determine if a script is present. In response to determining that the script 164 is present in the namespace 150, the UEFI 122 may parse the contents of the script 164 and generate the action tree 146. The action tree 146 enables the actions in the script 164 to be translated into virtual mouse actions and virtual keyboard actions to modify a configuration of the UEFI 122. After the action tree 146 has been executed, the UEFI 122 may save the results of performing the actions in the action tree 146 into the namespace 150 (e.g., the script status 152) and perform a reboot. After the reboot, the chat application 134 may regain control and read the script status 152 indicating a result of executing the script 164. The chat application 134 may send a message to the server 104 indicating whether or not the script 164 was successfully executed. The chat application 134 may notify the user as to whether the script 164 was successfully executed, for example, by displaying a message to the user.

Thus, when a user encounters an issue when using a computing device, the user may use a chat application to initiate a chat with a software agent ("chat bot"). The software agent may ask the user a series of questions to understand the issue. The software agent may take the transcript of the chat, along with logs (e.g., system logs, error logs, diagnostic logs, and the like), filter the data, and use natural language processing to identify problem tokens. A supervised learning model (SLM) may attempt to identify solution tokens corresponding to the problem tokens. If the SLM is able to identify corresponding solution tokens, then then SLM may retrieve an associated script and send the script to the computing device. If the SLM is unable to identify corresponding solution tokens, then then SLM may create a new script, associate the script with the problem tokens, and send the script (e.g., via the chat application) to the computing device. The chat application may store the script in a particular location in non-volatile memory and cause a reboot of the computing device into UEFI BIOS setup. After the UEFI BIOS enters setup, the UEFI BIOS may check the particular location to determine if a script has been stored there. After determining that a script has been stored in the particular location in non-volatile memory, the UEFI BIOS may retrieve the script. In some cases, the UEFI BIOS may use the BIOS procedure calls in the script to construct an action tree that includes actions to be performed by a virtual mouse and/or a virtual keyboard. The UEFI BIOS may execute the script by executing the actions in the action tree, thereby causing modifications to the UEFI BIOS to create a modified UEFI BIOS. The modified UEFI BIOS may address the issue that the user was encountering. When executing the script (e.g., the action tree), the result of executing the script may be stored in the non-volatile memory. For example, if the script was successfully executed, then the result may indicate that the script was successfully executed. If the script was not successfully executed, e.g., errors were encountered or all the actions in the script could not be completed, then the result may indicate that the script was unsuccessful. After the UEFI BIOS has been modified, the UEFI BIOS may delete the script from the particular location in non-volatile memory and perform a reboot. After the reboot, the chat application may determine the result of executing the script (e.g., the result that is stored in non-volatile memory) and report the result to the server. The chat application may also provide a message to the user indicating what actions were performed to address the issue, e.g., "The BIOS was reconfigured to enable secure boot", "The BIOS was reconfigured to enable Wake-On LAN", or the like.

Figure 2:
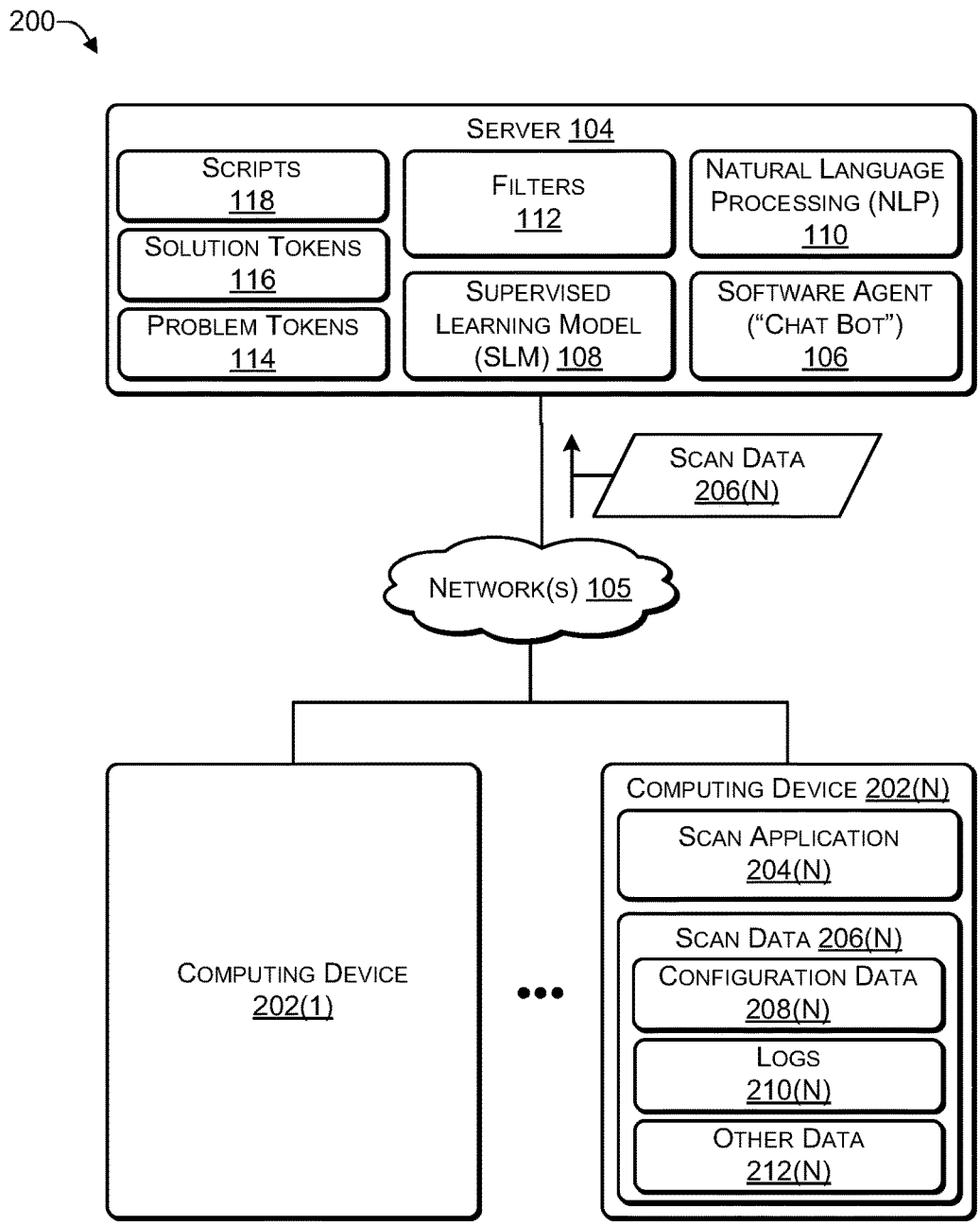
FIG. 2 is a block diagram of a system in which multiple computing devices send data to a server for analysis, according to some embodiments.

FIG. 2 is a block diagram of a system 200 in which multiple computing devices send data to a server for analysis, according to some embodiments. A manufacturer of computing devices (e.g., desktops, laptops, tablets, smartphones, smartwatches, and the like), such as Dell, HP, Apple, Lenovo, and so on, may gather data from multiple computing devices to create a supervised learning network grid. For example, by gathering data from multiple computing devices, the manufacturer can identify which settings (including UEFI BIOS settings) provide particular results, such as highest Wi-Fi throughput, fastest Ethernet throughput, and the like. By correlating the settings with system logs, the manufacturer can identify which settings may cause issues and which settings may result in issue-free operation. In this way, the manufacturer can identify UEFI BIOS settings that produce a particular result (e.g., high network throughput, fastest hyperthreading execution, or the like) and use the same (or similar) settings with other computing devices that have the same (or similar) UEFI BIOS. For example, a gaming platform may provide particular settings not available on a consumer platform or an enterprise platform. The manufacturer may modify the settings from a gaming platform for use with other types of platforms.

The system 200 may include multiple computing devices 202(1) to 202(N) (where N>0) coupled to the server 104 via the networks 105. For example, the computing devices 202 may include the computing device 102 of FIG. 1. Each of the computing devices 202 may include various applications and data. For example, the computing device 202(N) may include a scan application 204(N) to scan the computing device 202(N) to determine data, such as scan data 206(N). The scan data 206(N) may include configuration data 208(N), logs 210(N), and other data 212(N). The configuration data 208(N) may indicate how various components of the computing device 202(N) are configured. For example, the configuration data 208(N) may include configuration information about (i) a network interface card (NIC), (ii) a secure boot feature, (iii) features associated with the central processing unit (CPU), such as hyperthreading and the like, and other features, particularly features that can be set or modified using a BIOS of the computing device 202(N) (e.g., the UEFI BIOS 122 of FIG. 1). The logs 210(N) may be generated by various components of the computing device 202(N) and may include error logs, diagnostic logs, installation logs, and the like. The components that generate the logs 210(N) may include an operating system, various drivers associated with hardware components, various applications, and various hardware components of the computing device 202(N). The other data 212(N) may include other data associated with the computing device 202(N) that the scan application 204(N) may gather.

After gathering the scan data 206(N), the scan application 204(N) may send the scan data 206(N) to the server 104. The scan application 204(N) may gather the scan data 206(N) in the background (e.g., as low priority process) to reduce an impact on the consumption of resources of the computing device 202(N). The scan application 204(N) may send the scan data 206(N) to the server 104 at a predetermined time interval (e.g., every X hours, X>0, such as X=1, 2, 4, 6, 8, 12, 24, or the like). In this way, by gathering the scan data 206 from the computing devices 202, the server 104 may identify which UEFI BIOS settings provide particular results, such as highest Wi-Fi throughput, fastest Ethernet throughput, enable secure boot, and the like. By correlating the configuration data 208 with the logs 210, the server 104 may identify which settings may cause issues and which settings may result in issue-free operation. In this way, the server 104 can identify UEFI BIOS settings that produce a particular result (e.g., high network throughput, fastest hyperthreading execution, or the like) and use the same (or similar) settings with other computing devices that have the same (or similar) UEFI BIOS. For example, a gaming platform may provide particular settings not available on a consumer platform or an enterprise platform. The server 104 may modify the settings from a gaming platform for use with other types of platforms.

Figure 3:
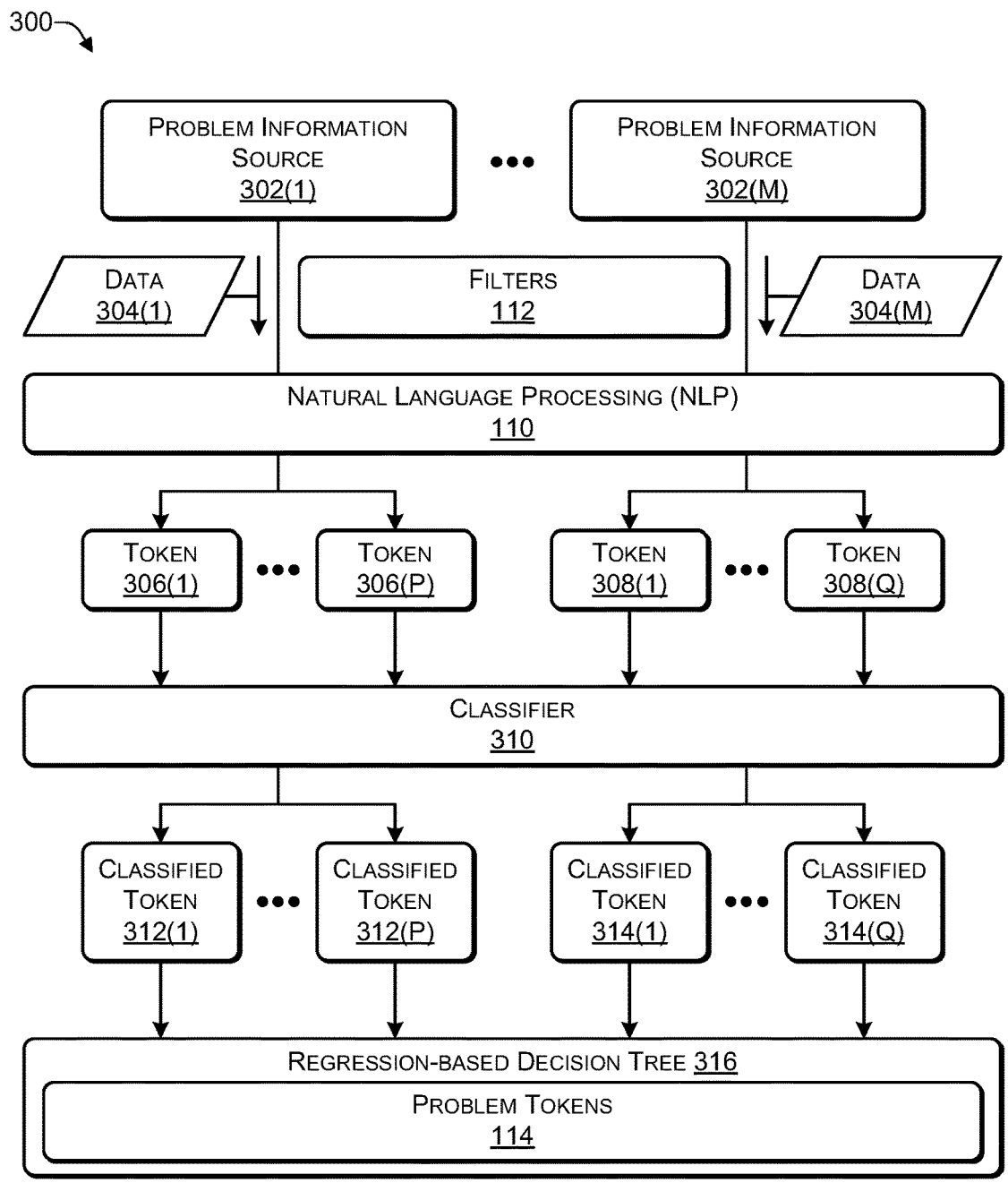
FIG. 3 is a block diagram of a system to derive problem-related tokens, according to some embodiments.

FIG. 3 is a block diagram of a system 300 to derive problem-related tokens, according to some embodiments. Various problem information sources 302(1) to 302(M) (M>0) may be used to determine the problem tokens 114. For example, the problem information sources 302 may include error logs, system error code maps (e.g., a map of the software that identifies where each software error code is generated), transcripts of chats, the scan data 206 of FIG. 2, knowledgebase data (e.g., a knowledgebase is a database in which common problems and the corresponding solutions are stored), and other sources of problem-related information.

The data from each of the problem information sources, e.g., data 304(1) from problem information source 302(1) and data 304(N) from problem information source 302(N), may be filtered using the filters 112 and the NLP 110 may be used to create tokens. For example, the data 304(1) may be used to create tokens 306(1) to 306(P) and the data 304(M) may be used to create tokens 308(1) to 308(Q) (P>0, Q>0). Each of the tokens 306, 308 may be a word or phrase associated with an issue, such as, for example, enable, disable, Wi-Fi, wireless, security, boot, boot order, secure boot, power management, virtualization, performance, processor, video, power-on self-test (POST), network, wireless, password, and the like.

A classifier 310 (e.g., a type of machine learning model) may be used to classify each of the tokens 306, 308 to create classified tokens. For example, the classifier 310 may classify the tokens 306(1) to 306(P) to create classified token 312(1) and 312(P), respectively. The classifier 310 may classify the tokens 308(1) to 308(Q) to create classified token 314(1) and 314(Q), respectively.

The classified tokens 312, 314 may be used to construct a regression-based decision tree 316. The regression-based decision tree 316 breaks down a dataset (e.g., the classified tokens 312, 314) into smaller and smaller subsets while incrementally creating an associated decision tree. The regression-based decision tree 316 is a tree structure with decision nodes and leaf nodes. A decision node (e.g., Wi-Fi) has two or more branches (e.g., enabled or disabled), with each representing values for the attribute being tested. The regression-based decision tree 316 is built top-down from a root node and involves partitioning the data into subsets that contain instances with similar values (homogenous). Decision tree learning uses the regression-based decision tree 316 (as a predictive model) to go from the classified tokens 312, 314 (represented in the branches) to the item's target (represented in the leaves).

Figure 4:
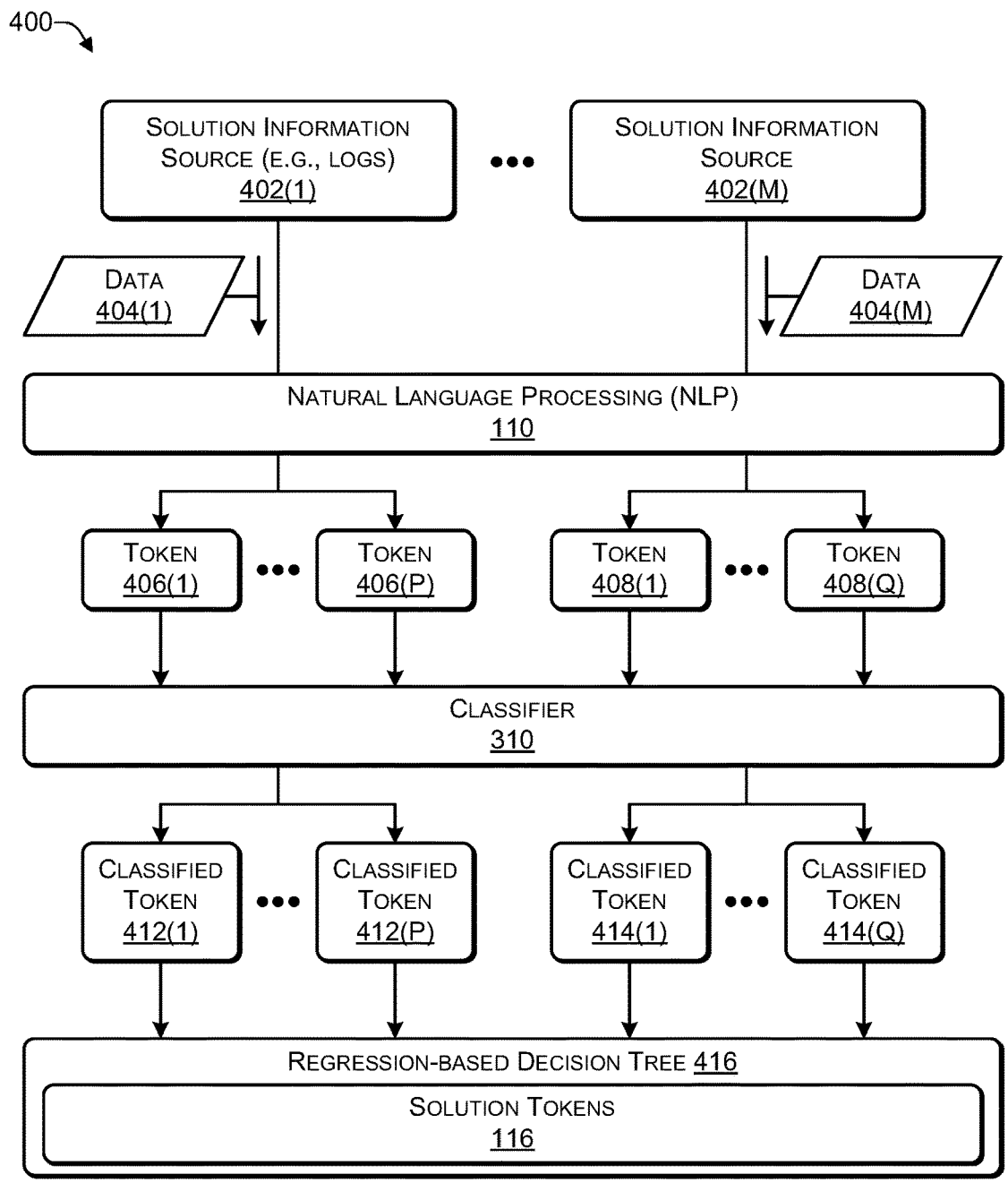
FIG. 4 is a block diagram of a system to derive solution-related tokens, according to some embodiments.

FIG. 4 is a block diagram of a system 400 to derive solution-related tokens, according to some embodiments. Various solution information sources 402(1) to 402(M) (M>0) may be used to determine the solution tokens 116. For example, the solution information sources 402 may include frequently asked questions (FAQ), operational manuals, knowledgebase data (e.g., a knowledgebase is a database in which common problems and the corresponding solutions are stored), a database where technical support specialists log known issues and solutions or workarounds, and other sources of solution-related information.

The data from each of the solution information sources, e.g., data 404(1) from solution information source 402(1) and data 404(N) from solution information source 402(N), may be filtered using the filters 112 and the NLP 110 may be used to create tokens. For example, the data 404(1) may be used to create tokens 406(1) to 406(P) and the data 404(M) may be used to create tokens 408(1) to 408(Q) (P>0, Q>0). Each of the tokens 406, 408 may be a word or phrase associated with an issue, such as, for example, enable, disable, Wi-Fi, wireless, security, boot, boot order, secure boot, power management, virtualization, performance, processor, video, power-on self-test (POST), network, wireless, password, and the like.

The classifier 310 (e.g., a type of machine learning model) may be used to classify each of the tokens 406, 408 to create classified tokens. For example, the classifier 310 may classify the tokens 406(1) to 406(P) to create classified token 412(1) and 412(P), respectively. The classifier 310 may classify the tokens 408(1) to 408(Q) to create classified token 414(1) and 414(Q), respectively.

The classified tokens 412, 414 may be used to construct a regression-based decision tree 416. The regression-based decision tree 416 breaks down a dataset (e.g., the classified tokens 412, 414) into smaller and smaller subsets while incrementally creating an associated decision tree. The regression-based decision tree 416 is a tree structure with decision nodes and leaf nodes. A decision node (e.g., Wi-Fi) has two or more branches (e.g., enabled or disabled), with each representing values for the attribute being tested. The regression-based decision tree 416 is built top-down from a root node and involves partitioning the data into subsets that contain instances with similar values (homogenous). Decision tree learning uses the regression-based decision tree 416 (as a predictive model) to go from the classified tokens 412, 414 (represented in the branches) to the item's target (represented in the leaves).

Figure 5:
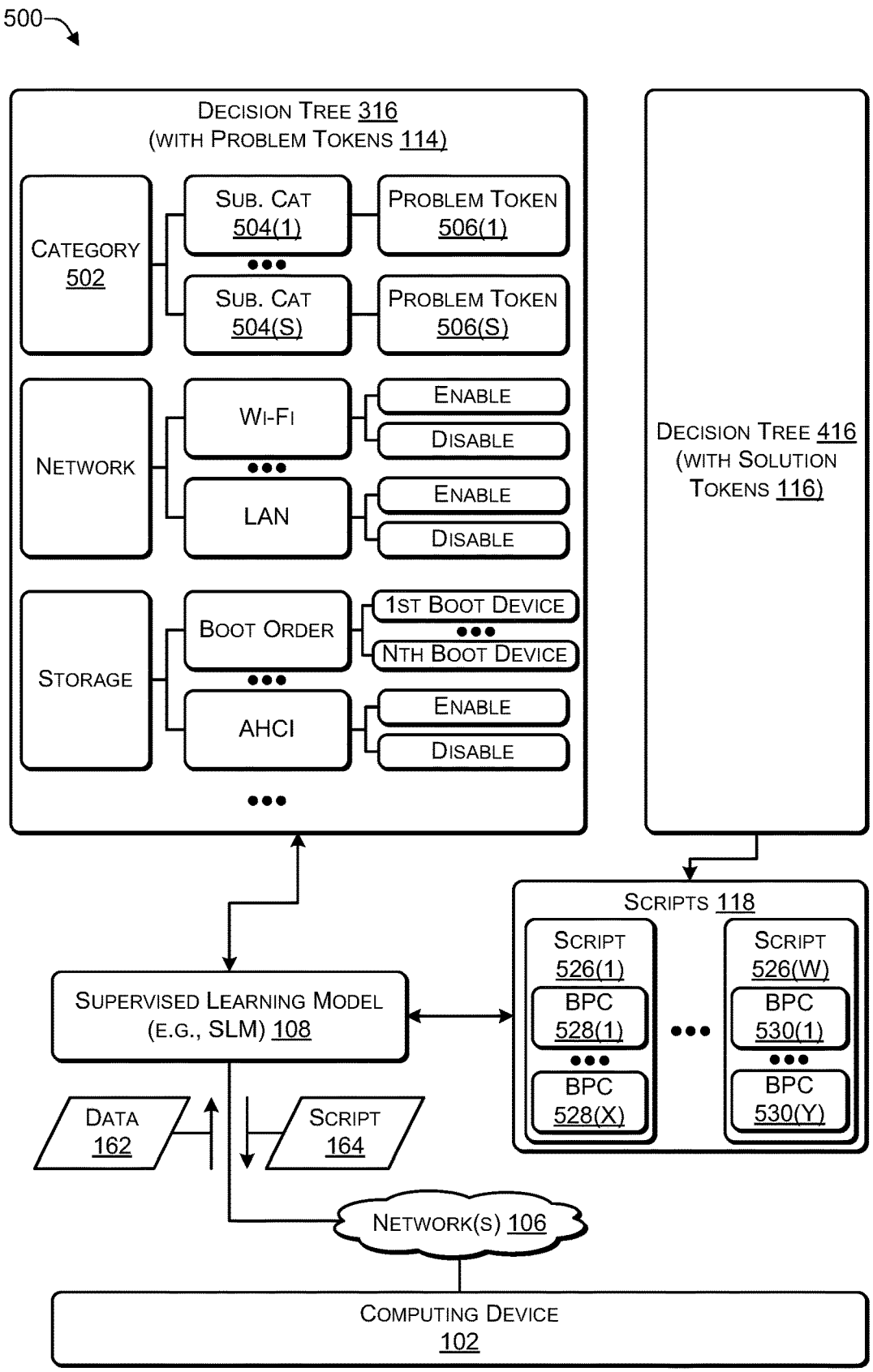
FIG. 5 is a block diagram of a system that includes identifying a solution token matching a problem token and selecting a corresponding script, according to some embodiments.

FIG. 5 is a block diagram of a system 500 that includes identifying a solution token matching a problem token and selecting a corresponding script, according to some embodiments. An example of the decision tree 316 constructed using the problem tokens 114 is illustrated in FIG. 5. The decision tree 416 that is constructed using the solution tokens 116 may be similar in structure to the decision tree 316.

The decision tree 316 may start at a root, e.g., a setup menu of the UEFI (BIOS) 122 of FIG. 1. The branches from the root may include multiple categories, such as a representative category 502. The multiple categories may include, for example, network, storage, processor, security, and the like. Each branch, such as the category 502, may have one or more branches, e.g., sub categories, 504(1) to 504(S) (S>0). For example, the network category may have multiple sub-categories (branches) such as, for example, Wi-Fi, local area network (LAN) and the like. In some cases, a sub-category may have additional branches (e.g., sub-sub-categories) while in other cases, the sub-category may have a leaf node, e.g., a problem token 506(1) associated with the sub-category 504(1) and a problem token 506(S) associated with the sub-category 504(S). For example, the Wi-Fi sub-category may have leaf nodes (problem tokens) enable Wi-Fi and disable Wi-Fi. The LAN sub-category may have leaf nodes (problem tokens) enable LAN and disable LAN. In some cases, the leaf nodes may include a numeric value. For example, for hyperthreading, a leaf node enable a maximum number of threads to specified. The storage category may have multiple sub-categories that include a boot order and Advanced Host Controller Interface (AHCI). The boot order sub-category may include multiple boot devices (e.g., problem tokens) arranged in a particular boot order, with a first boot device listed at the beginning of the boot order and a last (e.g., Nth) boot device listed at the end of the boot order. The AHCI sub-category may include an enable AHCI leaf (problem token) and a disable AHCI leaf (problem token). In this way, the problem tokens 114 may be organized into a tree structure based on the menu structure in the UI 138 of the UEFI 122 of FIG. 1. The decision tree 416 may have a similar structure based on the solution tokens 116.

When a user has an issue with the computing device 102, the SLM 108 may analyze the data 162 (e.g., including a chat transcript and/or logs) to identify the problem tokens 114. Based on the problem tokens 114 derived from the data 162, the SLM 108 may identify corresponding solution tokens in the decision tree 416. Based on the decision trees 316, 416, the SLM 108 may identify the script 164 from the scripts 118. The scripts 118 may includes a script 526(1) to a script 526(W), with each of the scripts 118 including one or more BPCs. For example, the script 526(1) may include BPC 528(1) to 528(X) (X>0) and the script 526(W) may include BPC 530(1) to 530(Y) (Y>0).

Thus, by refining the granularity of the problem tokens 114 and the solution tokens 116, an appropriate script can be identified or created to address a particular issue. The issue may be addressed in an automated manner, with the software agent 106 and the chat application 134 gathering data from the user, fathering logs, analyzing the data, and identifying and executing a script to automatically (without human interaction) modify the BIOS (UEFI 122 of FIG. 1) to create a modified BIOS to address the issue.

Figure 6:
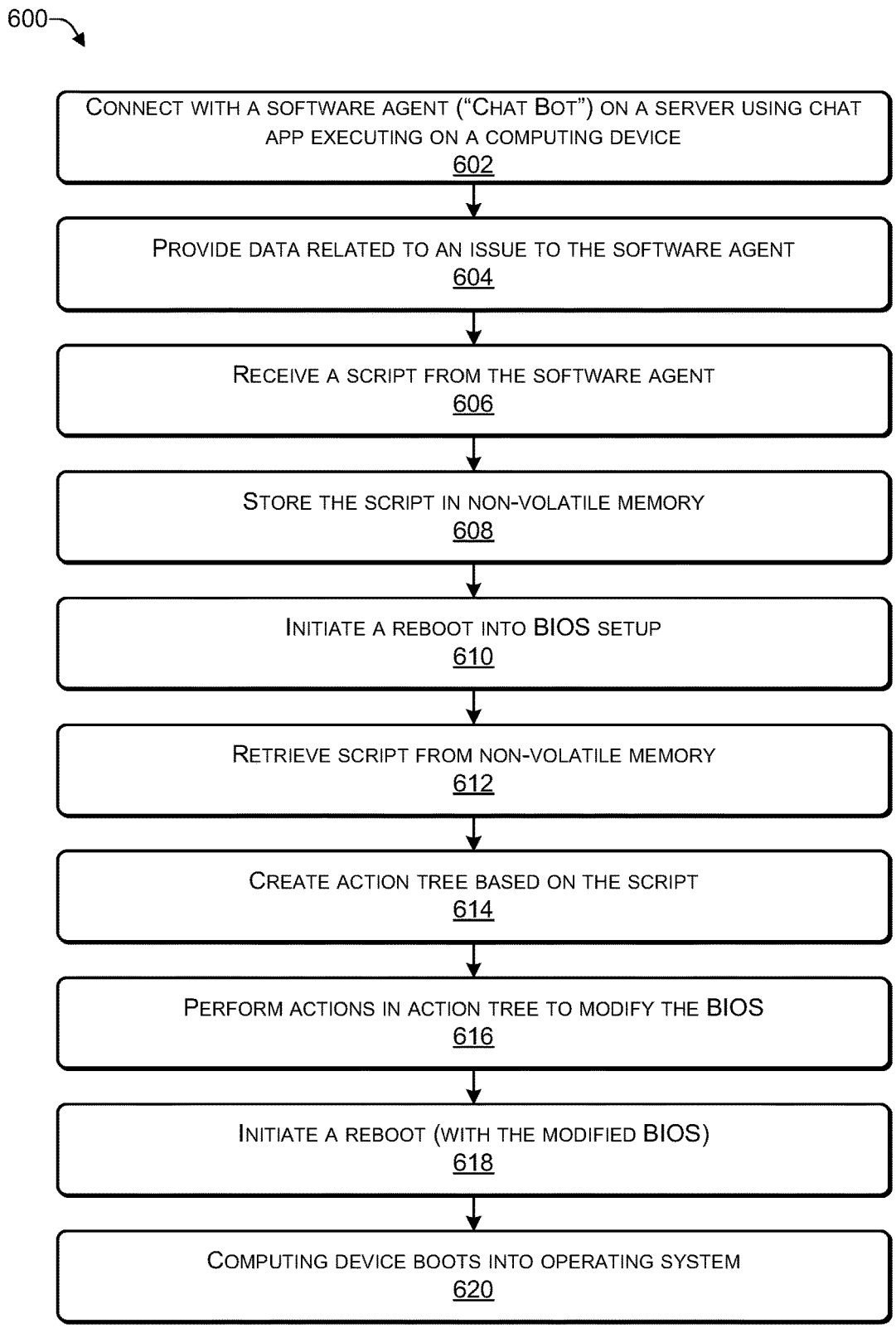
FIG. 6 is a flowchart of a process that includes a software agent executing a script to modify a BIOS, according to some embodiments.
Figure 7:
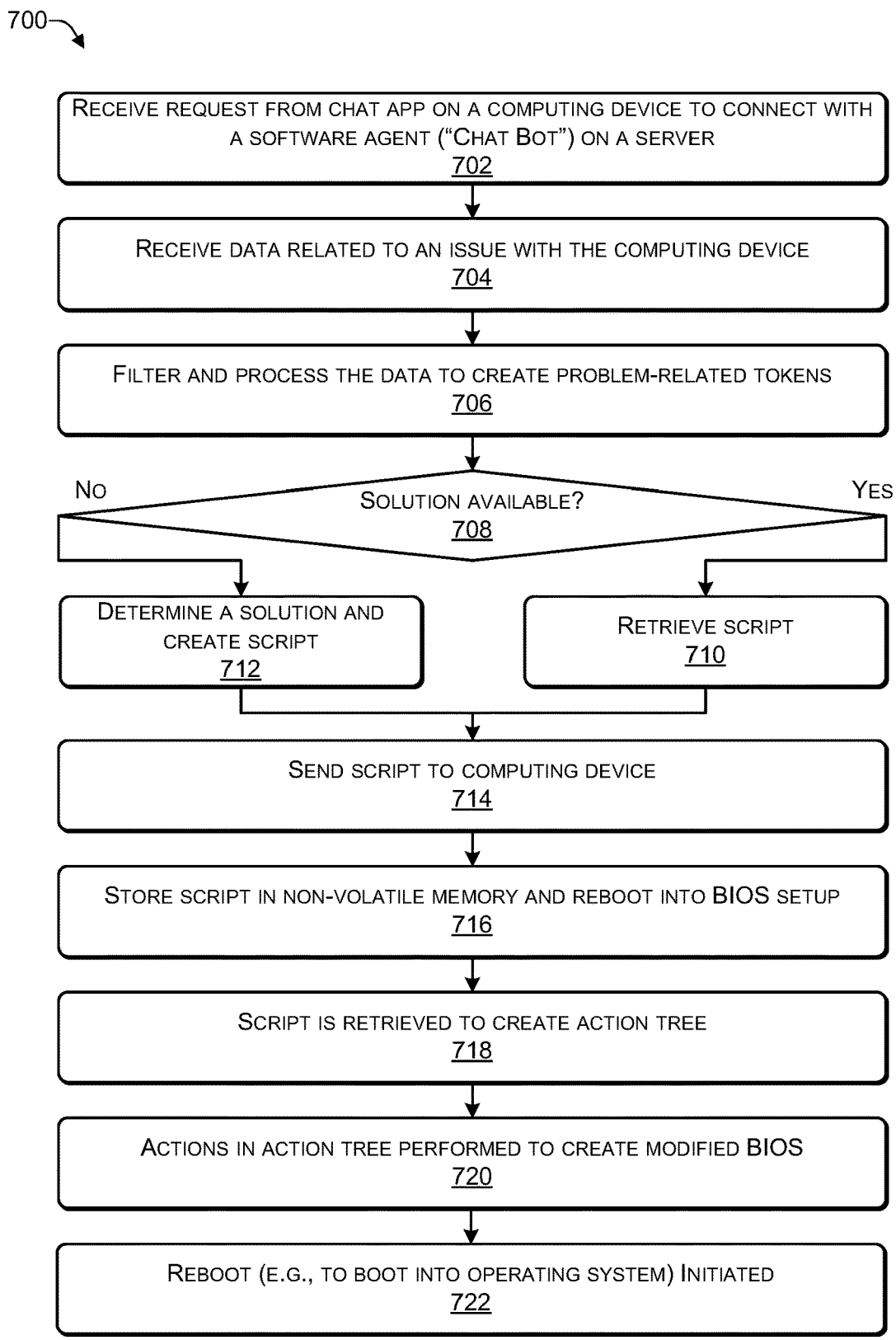
FIG. 7 is a flowchart of a process that includes retrieving and executing a script to modify a BIOS, according to some embodiments.

In the flow diagrams of FIG. 6 and FIG. 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 600 and 700 are described with reference to FIGS. 1, 2, 3, 4, and 5 as described above, although other models, frameworks, systems and environments may be used to implement these processes.

FIG. 6 is a flowchart of a process 600 that includes a software agent executing a script to modify a BIOS, according to some embodiments. The process 600 may be performed by the chat application 134, the software agent 106 of FIG. 1, or both.

At 602, a chat application on a computing device may be used to connect with a software agent ("chat bot") on a server. At 604, during a chat, data related to an issue of the computing device may be provided to the software agent. For example, in FIG. 1, when a user has an issue with the computing device 102, the user may use the chat application 134 to initiate a chat with the software agent 106. The software agent 106 may attempt to understand the issue or problem by sending a series of chat questions 158, and receive in response, a series of chat responses 160. In some cases, the software agent 106 may use the chat application 134 to retrieve data, including one or more of the logs 154 (e.g., system logs, error logs, diagnostic logs, and the like).

At 606, a script (e.g., selected based on the data in the chat) may be received from the software agent. For example, in FIG. 1, the server 104 may filter the data 162 using the filters 112 (e.g., to remove stop words) and analyze the filtered data using the NLP 110 to create one or more problem tokens 114. The SLM 108 may analyze the problem tokens 114 to identify corresponding solution tokens 116. If a particular script in the scripts 118 is associated with the corresponding solution tokens 116, then the server 104 may select the script 164 from the scripts 118 and send the script 164 (e.g., via the chat application 134) to the computing device 102. If a particular script in the scripts 118 is not associated with the corresponding solution tokens 116, then the server 104 may create the script 164 to address the issue and send the script 164 (e.g., via the chat application 134) to the computing device 102. For example, the chat responses 160 may be used to create the script 164, based on the problem tokens 114, to configure the UEFI 122 to address the issues.

At 608, the script may be stored in non-volatile memory. At 610, a reboot into BIOS setup may be initiated. At 612, the script may be retrieved from non-volatile memory. At 614, an action tree may be created based on the script. At 616, the actions in the action tree may be performed (e.g., using a virtual mouse and a virtual keyboard) to modify the BIOS to create a modified BIOS. For example, in FIG. 1, the chat application 134 may receive the script 164 and use the ACPI RT services 142 to store the script 164 in the namespace 150 of the non-volatile memory 124. After the script 164 has been stored in the namespace 150, the chat application 134 (e.g., based on an instruction from the software agent 106) may trigger a reboot of the computing device 102 into BIOS setup, e.g., a state in which the UEFI 122 can be setup. The UEFI 122 may, in response to determining that a reboot into a setup of the UEFI 122 occurred, retrieve the script 164 from the namespace 150 and execute the script 164 (e.g., execute the BIOS procedure calls 166 in the script 164). Executing the script 164 may cause one or more modifications to be performed to the UEFI 122 to create a modified UEFI 122. For example, the script 164 may include a sequence of actions to be performed on the UEFI (BIOS) 122 to update the BIOS settings. After the reboot, the UEFI 122 checks the namespace 150 to determine if a script is present. In response to determining that the script 164 is present in the namespace 150, the UEFI 122 may parse the contents of the script 164 and generate the action tree 146. The action tree 146 enables the actions in the script 164 to be translated into virtual mouse actions and virtual keyboard actions to modify a configuration of the UEFI 122. The modified UEFI 122 may be modified to address the issue(s) identified based on the data 162.

At 618, a reboot may be initiated. At 620, the reboot may cause the computing device to boot into an operating system of the computing device. For example, in FIG. 1, after the script 164 has been executed, the UEFI 122 may perform a reboot. In some cases, a last command in the script 164 may be a reboot instruction. Thus, the UEFI 122 (e.g., BIOS) may be modified automatically and unattended by executing the script 164 to perform a pre-boot (e.g., before the OS 120 is booted) reconfiguration of the UEFI 122.

FIG. 7 is a flowchart of a process 700 that includes retrieving and executing a script to modify a BIOS, according to some embodiments. The process 700 may be performed by the chat application 134, the software agent 106 of FIG. 1 or both.

At 702, a software agent executing on a server may receive a request to connect from a chat application executing on a computing device. At 704, the software agent may receive data related to an issue with the computing device (e.g., from the chat application). For example, in FIG. 1, when a user has an issue with the computing device 102, the user may use the chat application 134 to initiate a chat with the software agent 106. The software agent 106 may gather information associated with the issue by sending a series of chat questions 158, and receive in response, a series of chat responses 160. In some cases, the software agent 106 may use the chat application 134 to retrieve data, including one or more of the logs 154 (e.g., system logs, error logs, diagnostic logs, and the like).

At 706, the process may filter and process the data to create problem-related tokens. At 708, the process may determine if a solution is available. In response to the process determining, at 708, that "yes" a solution is available, the process may retrieve a script from multiple scripts, at 710. In response to the process determining, at 708, that "no" a solution is unavailable, the process may create a new script and add it to the existing multiple scripts, at 712. At 714, the process may send the script to the computing device. For example, in FIG. 1, the server 104 may filter the data 162 using the filters 112 (e.g., to remove stop words) and analyze the filtered data using the NLP 110 to create one or more problem tokens 114. The SLM 108 may analyze the problem tokens 114 to identify corresponding solution tokens 116. If a particular script in the scripts 118 is associated with the corresponding solution tokens 116, then the server 104 may select the script 164 from the scripts 118 and send the script 164 (e.g., via the chat application 134) to the computing device 102. If a particular script in the scripts 118 is not associated with the corresponding solution tokens 116, then the server 104 may create the script 164 to address the issue and send the script 164 (e.g., via the chat application 134) to the computing device 102. For example, the chat responses 160 may be used to create the script 164, based on the problem tokens 114, to configure the UEFI 122 to address the issues.

At 716, the process may store the script in non-volatile memory and reboot into a setup screen of a BIOS of the computing device. At 718, the process may boot into the BIOS setup, determine that a script is available, retrieve the script (e.g., from non-volatile memory), and create an action tree based on the script. At 720, the process may perform actions in the action tree to create a modified BIOS. For example, in FIG. 1, the chat application 134 may receive the script 164 and use the ACPI RT services 142 to store the script 164 in the namespace 150 of the non-volatile memory 124. After the script 164 has been stored in the namespace 150, the chat application 134 (e.g., based on an instruction from the software agent 106) may trigger a reboot of the computing device 102 into BIOS setup, e.g., a state in which the UEFI 122 can be setup. The UEFI 122 may, in response to determining that a reboot into a setup of the UEFI 122 occurred, retrieve the script 164 from the namespace 150 and execute the script 164 (e.g., execute the BIOS procedure calls 166 in the script 164). Executing the script 164 may cause one or more modifications to be performed to the UEFI 122 to create a modified UEFI 122. For example, the script 164 may include a sequence of actions to be performed on the UEFI (BIOS) 122 to update the BIOS settings. After the reboot, the UEFI 122 checks the namespace 150 to determine if a script is present. In response to determining that the script 164 is present in the namespace 150, the UEFI 122 may parse the contents of the script 164 and generate the action tree 146. The action tree 146 enables the actions in the script 164 to be translated into virtual mouse actions and virtual keyboard actions to modify a configuration of the UEFI 122. The modified UEFI 122 may be modified to address the issue(s) identified based on the data 162.

At 722, the process may initiate a reboot, causing the computing device to boot into an operating system of the computing device. For example, in FIG. 1, after the script 164 has been executed, the UEFI 122 may perform a reboot. In some cases, a last command in the script 164 may be a reboot instruction. Thus, the UEFI 122 (e.g., BIOS) may be modified automatically and unattended by executing the script 164 to perform a pre-boot (e.g., before the OS 120 is booted) reconfiguration of the UEFI 122.

Figure 8:
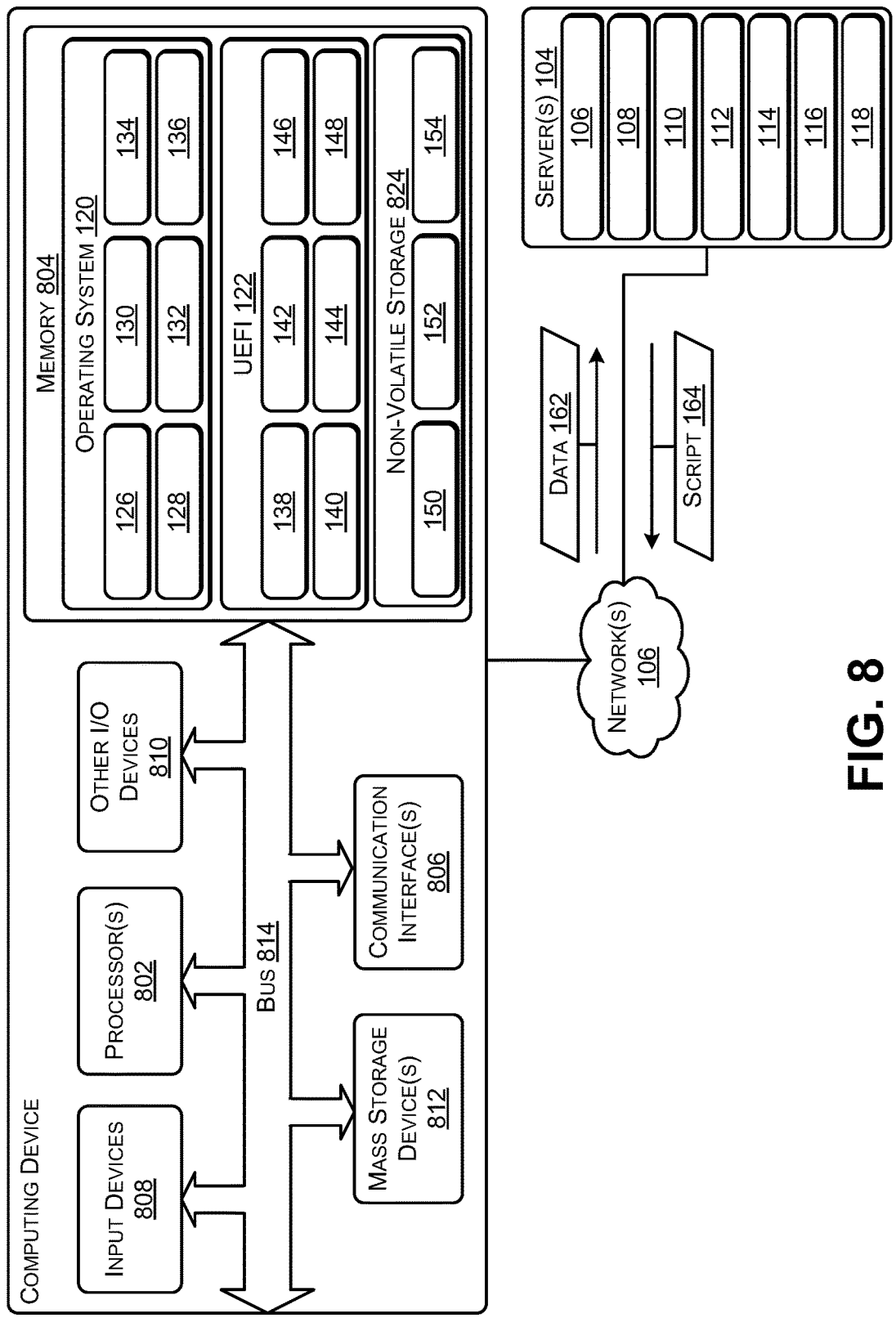
FIG. 8 illustrates an example configuration of a computing device that can be used to implement the systems and techniques described herein.

FIG. 8 illustrates an example configuration of a computing device 800 that can be used to implement the computing device 102 or the server 104 of FIGS. 1, 2, 3, 4, and 5. For illustration purposes, in FIG. 8, the computing device 800 is shown as implementing the computing device 102.

The computing device 800 may include one or more processors 802 (e.g., CPU, GPU, or the like), a memory 804, communication interfaces 806, a display device 808, input devices 808, other input/output (I/O) devices 810 (e.g., trackball and the like), and one or more mass storage devices 812 (e.g., disk drive, solid state disk drive, or the like), configured to communicate with each other, such as via one or more system buses 814 or other suitable connections. While a single system bus 814 is illustrated for ease of understanding, it should be understood that the system buses 814 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 802 are one or more hardware devices that may include a single processing unit or a number of processing units, all of which may include single or multiple computing units or multiple cores. The processors 802 may include a graphics processing unit (GPU) that is integrated into the CPU or the GPU may be a separate processor device from the CPU. The processors 802 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 802 may be configured to fetch and execute computer-readable instructions stored in the memory 804, mass storage devices 812, or other computer-readable media.

Memory 804 and mass storage devices 812 are examples of computer storage media (e.g., memory storage devices) for storing instructions that can be executed by the processors 802 to perform the various functions described herein. For example, memory 804 may include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein and may be any type of non-transitory media capable of storing computer-readable, processor-executable program instructions as computer program code that can be executed by the processors 802 as a particular machine configured for carrying out the operations and functions described in the implementations herein.

The computing device 800 may include one or more communication interfaces 806 for exchanging data via the network 106 (e.g., when the computing device 800 is connected to the dock 104). The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 806 can also provide communication with external storage, such as a storage array, network attached storage, storage area network, cloud storage, or the like.

The display device 808 may be used for displaying content (e.g., information and images) to users. Other I/O devices 810 may be devices that receive various inputs from a user and provide various outputs to the user, and may include a keyboard, a touchpad, a mouse, a printer, audio input/output devices, and so forth. The computer storage media, such as memory 804 and mass storage devices 812, may be used to store software and data, as illustrated.

Thus, when a user encounters an issue when using the computing device 800, the user may use the chat application 134 to initiate a chat with the software agent ("chat bot") 106. The software agent 106 may ask the user a series of one or more questions to understand the issue. The software agent 106 may use the data 612, including the transcript of the chat and the logs 154 (e.g., system logs, error logs, diagnostic logs, and the like), filter the data 162 using the filters 112, and use NLP 110 to identify problem tokens 114.

The SLM 108 may attempt to identify solution tokens 116 corresponding to the problem tokens 114. If the SLM 108 is able to identify corresponding solution tokens 116, then then SLM 108 may retrieve an associated script 162 and send the script 164 to the computing device 102. If the SLM 108 is unable to identify corresponding solution tokens 116, then then SLM 108 may create a new script 164, associate the script 164 with the problem tokens 114, and send the script 164 to the computing device 102. The chat application 134 may store the script 164 in a particular location (e.g., the namespace 150) in non-volatile memory 124 and cause a reboot of the computing device 102 into a setup of the UEFI (BIOS) 122. After the UEFI 122 enters setup, the UEFI 122 may check the particular location (e.g., namespace 150) to determine if a script has been stored there. After determining that the script 164 has been stored in the namespace 150 in non-volatile memory 124, the UEFI 122 may retrieve the script 164. In some cases, the UEFI 122 may use the BIOS procedure calls 166 in the script 164 to construct the action tree 146 that includes actions to be performed by a virtual mouse and/or a virtual keyboard. The UEFI 122 may execute the script 164 by executing the actions in the action tree 146, thereby causing the virtual mouse and/or keyboard to perform modifications to the UEFI 122 to create a modified UEFI 122. The modified UEFI 122 may address the issue that the user was encountering. When executing the script 164 (e.g., the action tree 146), the result (script status 152) of executing the script 164 may be stored in the non-volatile memory 124. For example, if the script 164 was successfully executed, then the script status 152 may indicate that the script 164 was successfully executed. If the script status 152 indicates that the script 164 was not successfully executed, e.g., errors were encountered or at least one of the actions in the script 164 could not be successfully completed, then the script status 152 may indicate that the script 164 was unsuccessful. After the UEFI 122 has been modified, the UEFI 122 may delete the script 164 from the particular location (e.g., namespace 150) in non-volatile memory 124 and perform a reboot of the computing device 102. After the reboot, the chat application 134 may determine the result of executing the script 164 (e.g., the script status 152 that is stored in the non-volatile memory 124) and report the result to the server 104. The chat application 134 may also provide a message to the user indicating what actions were performed to address the issue, e.g., "The BIOS was reconfigured to enable secure boot", "The BIOS was reconfigured to enable Wake-On LAN", "The boot order was changed to boot from disk 1 before disk 2" or the like.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
sending, by one or more processors of a computing device, data associated with an issue of the computing device to a sever;
receiving, by the one or more processors, a script from the server, wherein the script is selected by a supervised learning model executing on the server;
storing, by the one or more processors, the script in a non-volatile memory of the computing device;
rebooting, by the one or more processors, the computing device into a setup state of a basic input output system (BIOS) of the computing device;
executing, by the one or more processors, the script to modify the BIOS to create a modified BIOS, wherein the modified BIOS addresses the issue of the computing device; and
rebooting, by the one or more processors, the computing device to boot into an operating system.

2. The method of claim 1, wherein the data comprises:
a chat transcript comprising questions sent by a software agent executing on the server and answers corresponding to the questions; and
one or more logs stored on the computing device, wherein the one or more logs include at least one of a system log, an error log, or a diagnostic log.

3. The method of claim 1, wherein:
the script comprises one or more BIOS procedure calls.

4. The method of claim 1, wherein storing the script in the non-volatile memory of the computing device comprises:
storing the script in a namespace of the non-volatile memory of the computing device.

5. The method of claim 1, wherein executing script to modify the BIOS to create the modified BIOS comprises:
determining one or more BIOS procedure calls included in the script;
creating an action tree based on the one or more BIOS procedure calls; and
executing each action in the action tree using at least one of a virtual mouse or a virtual keyboard to modify the BIOS.

6. The method of claim 5, further comprising:
storing, in a namespace of the non-volatile memory, a status indicating whether the script was successfully executed.

7. A computing device comprising:
one or more processors; and
one or more non-transitory computer-readable storage media to store instructions executable by the one or more processors to perform operations comprising:
sending data associated with an issue of the computing device to a server, wherein the data comprises one or more logs stored on the computing device, wherein the one or more logs include at least one of a system log, an error log, or a diagnostic log;
receiving a script from the server;
storing the script in a non-volatile memory of the computing device;
rebooting the computing device into a setup state of a basic input output system (BIOS) of the computing device;
executing the script to modify the BIOS to create a modified BIOS, wherein the modified BIOS addresses the issue of the computing device; and
rebooting the computing device to boot into an operating system.

8. The computing device of claim 7, wherein the data comprises:
a chat transcript comprising questions sent by a software agent executing on the server and answers corresponding to the questions.

9. The computing device of claim 7, wherein:
the script comprises one or more BIOS procedure calls.

10. The computing device of claim 7, wherein storing the script in the non-volatile memory of the computing device comprises:
storing the script in a namespace of the non-volatile memory of the computing device.

11. The computing device of claim 7, wherein executing script to modify the BIOS to create the modified BIOS comprises:
determining one or more BIOS procedure calls included in the script;
creating an action tree based on the one or more BIOS procedure calls; and
executing each action in the action tree using at least one of a virtual mouse or a virtual keyboard to modify the BIOS.

12. The computing device of claim 11, further comprising:
storing, in a namespace of the non-volatile memory, a status indicating that the script was either successfully executed or unsuccessful.

13. A server comprising:
one or more processors; and
one or more non-transitory computer-readable storage media to store instructions executable by the one or more processors to perform operations comprising:
receiving, by a software agent, a request from a chat application executing on a computing device to initiate a chat session;
sending one or more questions via the chat session requesting information about an issue associated with the computing device;

receiving, from the computing device via the chat session, one or more responses corresponding to the one or more questions;

processing a transcript of the chat session to create a plurality of problem tokens wherein the processing includes filtering the chat session to remove stop words to create a filtered chat session, and performing natural language processing on the filtered chat session to identify the plurality of problem tokens;

selecting, based on the plurality of problem tokens, a script to address the issue associated with the computing device;

sending the script to the computing device;

instructing the computing device to store the script in a non-volatile memory;

instructing the computing device to reboot into a setup state of a basic input output system (BIOS) of the computing device.

14. The one or more non-transitory computer readable media of claim 13, wherein the operations further comprise:

instructing the computing device to retrieve one or more logs stored on the computing device;

receiving the one or more logs from the computing device; and processing the one or more logs while processing the transcript of the chat session to create the plurality of classified problem tokens.

15. The one or more non-transitory computer readable media of claim 13, wherein:

the script comprises one or more BIOS procedure calls.

16. The one or more non-transitory computer readable media of claim 15, wherein:

the computing device constructs an action tree based on the one or more BIOS procedure calls, wherein each action in the action tree causes either a virtual mouse or a virtual keyboard to modify the BIOS.

17. The one or more non-transitory computer readable media of claim 13, wherein selecting, based on the plurality of problem tokens, the script to address the issue associated with the computing device comprises:

selecting the script using a supervised learning model.

18. The one or more non-transitory computer readable media of claim 13, wherein instructing the computing device to reboot into a setup state of a basic input output system (BIOS) of the computing device causes the computing device to:

retrieve the script from the non-volatile memory; and
execute the script to modify the BIOS to address the issue associated with the computing device.

* * * * *